Figure 1:
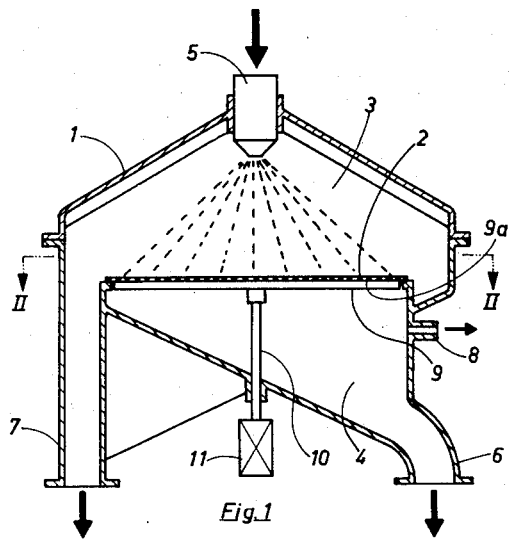

United States Patent [19]
Rundqvist

[11] 3,816,176

[45] June 11, 1974

[54] METHOD AND APPARATUS FOR CLEANING STRAINERS

[75] Inventor: Lars-Goran Rundqvist, Tumba, Sweden

[73] Assignee: AB Celleco, Tumba, Sweden

[22] Filed: Mar. 21, 1973

[21] Appl. No.: 343,233

[30] Foreign Application Priority Data
Mar. 29, 1972 Sweden.............................. 4067/72

[52] U.S. Cl...................... 134/34, 209/380, 210/411
[51] Int. Cl............................ B08b 3/02, B07b 1/50
[58] Field of Search........ 134/34; 210/108, 411, 82; 209/379, 380

[56] References Cited
UNITED STATES PATENTS
| | | | |
|---|---|---|---|
| 752,547 | 2/1904 | Harris et al.......................... | 210/108 |
| 1,103,167 | 1/1914 | Wood................................. | 209/273 |
| 2,833,412 | 5/1958 | Ahlmann.......................... | 209/380 X |
| 3,161,522 | 12/1964 | Compton.......................... | 210/400 X |
| 3,491,889 | 1/1970 | Walters............................... | 210/411 |

*Primary Examiner*—Morris O. Wolk
*Assistant Examiner*—Arnold Turk
*Attorney, Agent, or Firm*—Cyrus S. Hapgood

[57] ABSTRACT

The cleaning is effected by spraying water or other fluid upon one side of the strainer while positioning a reflecting surface closely adjacent the other side, whereby the spray passing through the strainer strikes this surface.

3 Claims, 4 Drawing Figures

3,816,176

METHOD AND APPARATUS FOR CLEANING STRAINERS

The present invention relates to a method of cleaning a strainer, for instance a wire-gauze or a perforated foil. The method is characterized in that a fluid is sprayed upon one side of the strainer and that a surface is at the same time arranged closely adjacent the strainer's other side, where this surface will be hit by fluid passing through the strainer.

The invention further relates to apparatus for the cleaning of a strainer by application of the method according to the invention. The apparatus comprises means for spraying a fluid onto one side of the strainer, and a device arranged to be applied at the other side of the strainer, while the fluid is being sprayed, so as to provide a surface lying closely adjacent to the said other side, where this surface will be hit by fluid passing through the strainer.

In a large number of industrial processes including straining operations, there is an old problem of the strainer becoming obstructed. It must then be cleaned, which of course causes loss of time and added expense, particularly as it is sometimes very difficult to clean the strainer. In some industrial processes in which the straining operation is a classification or sorting of the substance treated, the problem of obstruction is particularly serious, as the obstruction causes a gradual modification of the actual classifying means and an accompanying continuous alteration of the composition of the resulting fractions.

Similar conditions may occur in connection with a seemingly rather simple straining operation which mainly is intended only as a dewatering operation. One such case is the dewatering of cellulose fibres on the wire in a paper machine. In that case, a gradual obstruction of the wire will cause a gradual alteration of the quality of the paper produced, which alteration can be very difficult to prevent in some instances.

Generally speaking, the problem of obstruction of strainers has been particularly troublesome in the cellulose industry, where the obstruction to a great extent is related to a quick growth of certain micro-organisms encountered in that particular industry. By adding poisonous chemicals to the cellulose fibre suspensions, the art has previously been able to master those difficulties, but such methods can no longer be applied since it has been found that they add to the destruction of the environments.

The present invention has proved to solve these problems in a quite surprising way, even in such cases where the problem of cleaning the strainer has been regarded as insoluble. As previously mentioned, the method of cleaning according to the invention comprises the steps of spraying a fluid onto one side of the strainer and at the same time arranging a surface at the other side of the strainer closely adjacent to the same, where this surface will be hit by quantities of the spray passing through the strainer. It is not understood completely how this method works, but apparently the fluid sprayed upon one side of the strainer and passing through it will act upon the other side by being reflected towards the latter side after having hit the said surface.

The method according to the invention is suitable for an intermittent cleaning or in some cases a continuous cleaning of the strainer while a straining operation is in progress. It will thus be possible to keep the strainer continuously clean and thereby maintain its qualitative properties, and thus keep the results of the straining operation constant qualitatively and quantitatively.

Figure 3:
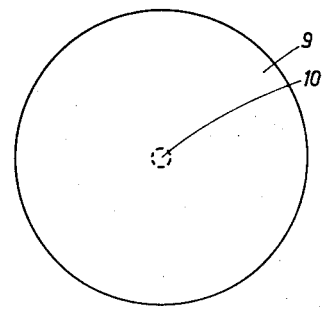
Figure 2:
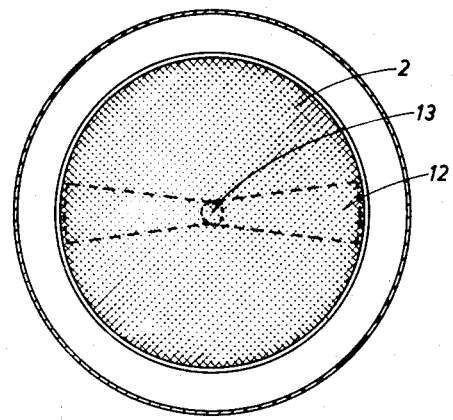
Figure 4:
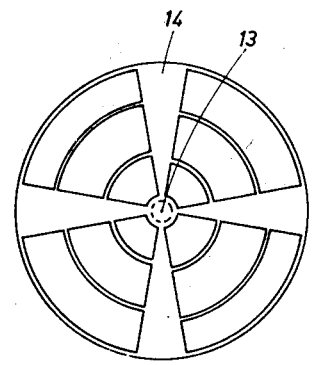
Figure 5:
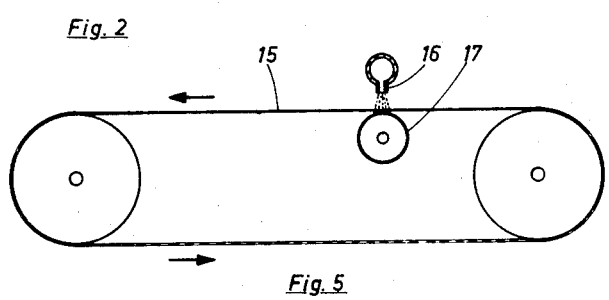

The invention and its advantages will be described more in detail below with reference to the accompanying drawings, in which FIG. 1 is a vertical sectional view of a fractionating strainer provided with means making the apparatus suitable for practicing the method according to the invention;

FIGS. 2, 3 and 4 are views of various forms of one detail of an arrangement according to the invention, and FIG. 5 is a schematic elevational view from one side of the wire in a paper machine, showing an arrangement for the application of the method according to the invention for a continuous or intermittent cleaning of the wire.

In the drawing, reference numeral 1 indicates a housing of a fractionating strainer. The housing is divided into two chambers 3 and 4 by a strainer means 2. Fine particles will pass through the strainer means and be collected in chamber 4, and coarse material will be separated and collected in chamber 3. The two fractions thus formed are led away from the respective chambers via outlets 6 and 7. There is generally a reduced pressure in chamber 4 which, by means of a nipple 8, is connected to a vacuum source. The inlet of the apparatus for material to be treated is a spray-nozzle 5. When the strainer means 2 is in need of cleaning, another liquid, for instance water, is sprayed by means of the spray-nozzle 5 in a full conical jet onto the strainer means. In chamber 4, that is on the other side of the strainer means, a device 9 is provided which has a surface 9a arranged so that it can be applied closely adjacent to the said other side of the strainer means, and so that it will be struck by the liquid passing through the strainer means.

In the embodiment shown in FIG. 1, the device 9 comprises a circular plate supported by a vertically movable rod 10. The plate 9 during the cleaning operation is held against or close to the lower side of the strainer means 2 by a hydraulic cylinder 11 containing a piston (not shown) secured to rod 10. The plate 9 is shown as seen from above in FIG. 3. As previously mentioned, the strainer means are cleaned by liquid that is sprayed upon and passes through the strainer means and is reflected towards the lower side of the same when it strikes the surface 9a of plate 9, whereby it acts upon the lower side of the strainer means. This embodiment shows surface to surface contact of reflecting surface and strainer.

In FIG. 2 there is shown a horizontal sectional view on line II—II in FIG. 1 but with the circular plate 9 replaced by a device 12 having two wings and rotatable in the horizontal plane, this device being supported by a spindle 13 corresponding to the rod 10 of FIG. 1. The spindle together with the wings 12 can be rotated by means of a motor corresponding to the hydraulic cylinder 11 of FIG. 1. As will be seen from FIG. 2, the wings 12 have a surface that is only a fraction of the surface of the strainer means 2. In this case, the wings are caused to rotate at a speed that is found best suited for the cleaning operation. Those parts of the strainer means overlying the wings 12 at a certain moment are cleaned by liquid being sprayed upon the strainer means and reflected by the surface of the wings towards the lower side of the strainer means. Owing to the rotational movement of the wings, the whole surface of the strainer means will thus be successively cleaned.

A modification of the device 12 is shown in FIG. 4. This modification is also supported by a vertical spindle 13 and caused to rotate. It has four wings 14 with surfaces which are hit by a liquid passing through the strainer means, so that the liquid is reflected against the lower side of the strainer means. This device has proved particularly advantageous, as it enables effective cleaning of the strainer means with a very slow rotational movement of the wings, which can be effected by a simple arrangement comprising a ratchet device.

In FIG. 5 of the drawing, the wire 15 in a paper machine is schematically shown. It is an endless running belt of wire gauze on the upper run of which a suspension of cellulose fibres is continuously delivered. It is important that small open spaces of the wire gauze not be obstructed, for then the draining of the water of the fibre suspension would be impeded, and the quality of the paper would continuously alter. However, the wire can easily be kept continuously clean by the method according to the present invention. For that purpose, there is provided a series of spray nozzles 16 arranged in a row perpendicular to the direction of movement of the wire. The spray nozzles spray water under high pressure onto the upper side of the upper run of the wire. Below this upper run is a rotating roller 17 arranged so that it will be hit by water coming from the nozzles 16. The sprayed water will pass through the wire's upper run and be reflected towards its lower side. Instead of a roller, an oblong plate can be arranged below the wire perpendicular to the direction of movement of the wire. A strainer means consisting of a rotating perforated cylinder can be continuously cleaned in a corresponding way.

In the examples described above for the application of the present invention, it has been assumed that the fluid sprayed in connection with the cleaning is water. The invention is not limited to the spraying of water, however, For example, the fluid may be any other liquid or steam, air or a gas, depending on which fluid has proved to be the most effective in a particular case.

I claim:

1. A method of cleaning a strainer, such as a wire gauze or a perforated foil, which comprises the steps of spraying a fluid upon one side of the strainer, and simultaneously positioning a reflecting surface against the other side of the strainer in surface to surface contact and thereby causing fluid passing through the strainer to strike said surface.

2. In combination with a strainer, such as a wire gauze or a perforated foil, a strainer cleaning apparatus comprising means for spraying a fluid upon one side of the strainer, and a device located at the other side of the strainer and having a surface lying against said other side of the strainer for surface to surface contact during said spraying, whereby fluid sprayed through the strainer strikes said device surface.

3. The combination of claim 2, in which the strainer is wire gauze mounted for movement in an endless path, said device being a rotating roller arranged with its axis perpendicular to the direction of said gauze movement.

* * * * *